United States Patent
Alston et al.

(10) Patent No.: US 8,675,668 B2
(45) Date of Patent: *Mar. 18, 2014

(54) METHODS, SYSTEMS, AND PRODUCTS FOR SHARING CONTENT

(75) Inventors: Douglas B. Alston, Fayetteville, GA (US); William Gaylord, Stone Mountain, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 356 days.

This patent is subject to a terminal disclaimer.

(21) Appl. No.: 12/648,759

(22) Filed: Dec. 29, 2009

(65) Prior Publication Data

US 2010/0100603 A1    Apr. 22, 2010

Related U.S. Application Data

(63) Continuation of application No. 11/142,105, filed on May 31, 2005, now Pat. No. 7,664,124.

(51) Int. Cl.
| H04L 12/28 | (2006.01) |
| H04W 74/00 | (2009.01) |
| G06F 15/16 | (2006.01) |
| G06F 15/173 | (2006.01) |

(52) U.S. Cl.
USPC ......... 370/401; 370/402; 455/455; 709/203; 709/217; 709/224

(58) Field of Classification Search
USPC ............... 370/401, 402; 709/203, 217, 224; 455/445
See application file for complete search history.

(56) References Cited

U.S. PATENT DOCUMENTS

| 7,664,124 | B2 * | 2/2010 | Alston et al. ............ 370/401 |
| 2001/0046234 | A1 | 11/2001 | Agrawal et al. |
| 2002/0103898 | A1 * | 8/2002 | Moyer et al. ............ 709/224 |
| 2003/0018714 | A1 * | 1/2003 | Mikhailov et al. ...... 709/203 |
| 2004/0003241 | A1 | 1/2004 | Sengodan et al. |
| 2004/0203657 | A1 * | 10/2004 | Koskelainen ........ 455/414.1 |
| 2004/0246244 | A1 * | 12/2004 | Nose ..................... 345/204 |
| 2005/0089040 | A1 * | 4/2005 | Kim ..................... 370/395.2 |
| 2005/0107086 | A1 * | 5/2005 | Tell et al. ................ 455/445 |
| 2005/0147224 | A1 * | 7/2005 | Olafsson et al. ....... 379/93.35 |
| 2005/0165899 | A1 * | 7/2005 | Mazzola ................. 709/217 |
| 2006/0013254 | A1 | 1/2006 | Shmueli et al. |
| 2006/0090166 | A1 | 4/2006 | Dhara et al. |
| 2006/0203758 | A1 * | 9/2006 | Tee et al. ................ 370/315 |
| 2006/0221987 | A1 * | 10/2006 | Polson ................... 370/402 |
| 2007/0064199 | A1 * | 3/2007 | Schindler et al. ......... 353/30 |
| 2008/0305821 | A1 | 12/2008 | Sung et al. |
| 2009/0052434 | A1 | 2/2009 | Jackson |
| 2009/0110171 | A1 | 4/2009 | Kannan et al. |
| 2009/0143086 | A1 | 6/2009 | Jeong |
| 2009/0150665 | A1 | 6/2009 | Kaippallimalil et al. |

* cited by examiner

*Primary Examiner* — Jung Park
*Assistant Examiner* — Albert Shih
(74) *Attorney, Agent, or Firm* — Cantor Colburn LLP

(57) ABSTRACT

Methods, systems, and products share content between a device and a media delivery device. The media delivery device includes a content sharing application stored in memory and a processor communicating with the memory. The processor sends a presence update message to indicate the media delivery device is active and available to receive content. The processor receives an invite, and the invite requests a session between the media delivery device and the device. The processor sends an accept message to accept the invitation. The processor receives the content and receives a message that terminates the session.

10 Claims, 19 Drawing Sheets

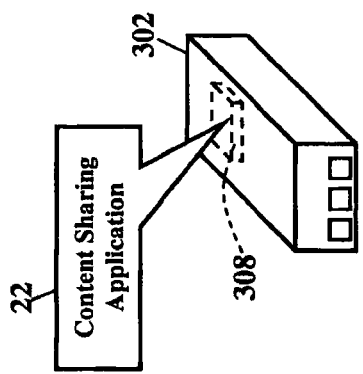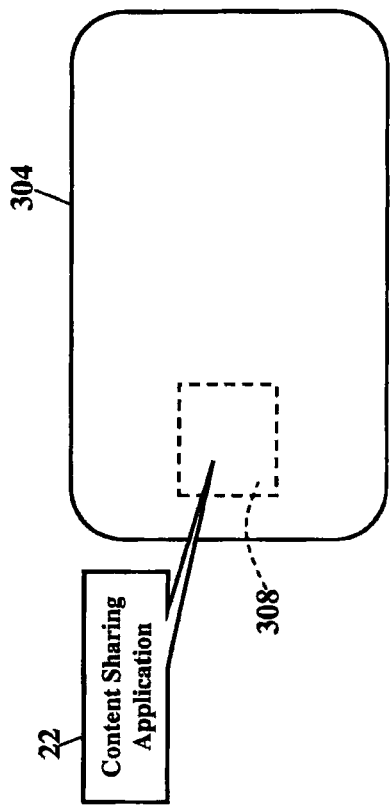

METHODS, SYSTEMS, AND PRODUCTS FOR SHARING CONTENT

CROSS-REFERENCE TO RELATED APPLICATIONS

This application is a continuation of and contains subject matter which is related to the subject matter of the following co-pending application which is hereby incorporated herein by reference in its entirety: application Ser. No. 11/142,105 entitled "METHODS, SYSTEMS AND PRODUCTS FOR SHARING CONTENT" filed May 31, 2005.

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to communications and, more particularly, to sharing content in communications.

Shared video streaming is popular among wireless users. Third generation networks allow two mobile devices (such as camera phones) to stream live video between each one another. The service is sometimes called "see what I see" and establishes a streaming session between the two phones. One person with a mobile phone makes a call, establishes a session, and then takes the camera on that phone and points it. The other person's phone receives the session transmission and displays the received images. Some 3G phones also have the capability to support voice transmission between the users.

One significant problem, however, is screen size. Today's mobile phones have small screens, and these small screens limit the appeal of "see what I see" services. If pictures, movies, and other content could be shared with larger display devices, one service provider believes that more people would utilize "see what I see" services. What is needed, then, is a "see what I see" service that is not limited to the small screen sizes of conventional mobile devices.

SUMMARY

The aforementioned problems, and other problems, are reduced, according to the exemplary embodiments, using methods, systems, and products that share pictures, movies, and other content with a media delivery device. These exemplary embodiments describe how mobile user, using any device, may share content with a media delivery device. The exemplary embodiments, for example, allow a camera phone to share video content with a computer, a television, or other media delivery device. The camera phone uses a messaging protocol to establish a session with the media delivery device. The media delivery device may then audibly and/or visually present the content originating from the camera phone. The camera phone, however, is only one example of a mobile device. As the following paragraphs will explain, the exemplary embodiments are applicable to any communications device, such as a computer, a personal digital assistant, a pager, or any other device. The exemplary embodiments are also applicable to any media delivery device, whether analog or digital. Because the content is shared with a media delivery device, having a larger screen than a conventional phone, more people will be willing to utilize "see what I see services."

The exemplary embodiments share content with a media delivery device. The media delivery device includes a content sharing application stored in memory and a processor communicating with the memory. The processor sends a presence update message to indicate the media delivery device is active and available to receive a stream of data. The processor receives an invite, and the invite requests a session between the media delivery device and another device. The processor sends an accept message to accept the invitation, and the processor receives the stream of data. The processor then receives a message that terminates the session.

In another of the embodiments, a method is disclosed for sharing a stream of data. A presence update message is sent to indicate a media delivery device is active and available to receive a stream of data. An invite is received, and the invite requests a session between the media delivery device and another device. The media delivery device sends an accept message to accept the invitation and begins receiving the stream of data. A message is then sent, or received, that terminates the session.

In yet another embodiment, a computer program product shares a stream of data between a media delivery device and another device. The computer program product comprises a computer-readable medium and a content sharing application stored on the computer-readable medium. The content sharing application comprises computer code for sending a presence update message to indicate the media delivery device is active and available to receive a stream of data. An invite is received, and the invite requests a session between the media delivery device and another device. The media delivery device sends an accept message to accept the invitation and begins receiving the stream of data. A message is then sent, or received, that terminates the session.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 16-19 are schematics further illustrating the mobile device, according to the exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, methods, systems, and products share pictures, movies, and other content with a media delivery device. These exemplary embodiments describe how mobile user, using any mobile device, may share content with a media delivery device. The exemplary embodiments, for example, allow a camera phone to share video content with a television. The camera phone uses a messaging protocol to establish a session with the television. The television may then audibly and/or visually present the content originating from the camera phone. The camera phone, however, is only one example of a mobile device, and the television is only one example of the media delivery device. As the following paragraphs will explain, the exemplary embodiments are applicable to any communications device, such as a computer, a personal digital assistant, a pager, or any other device. Because the content is shared with a media delivery device, having a larger screen than a conventional phone, more people will be willing to utilize "see what I see services."

Figure 1:
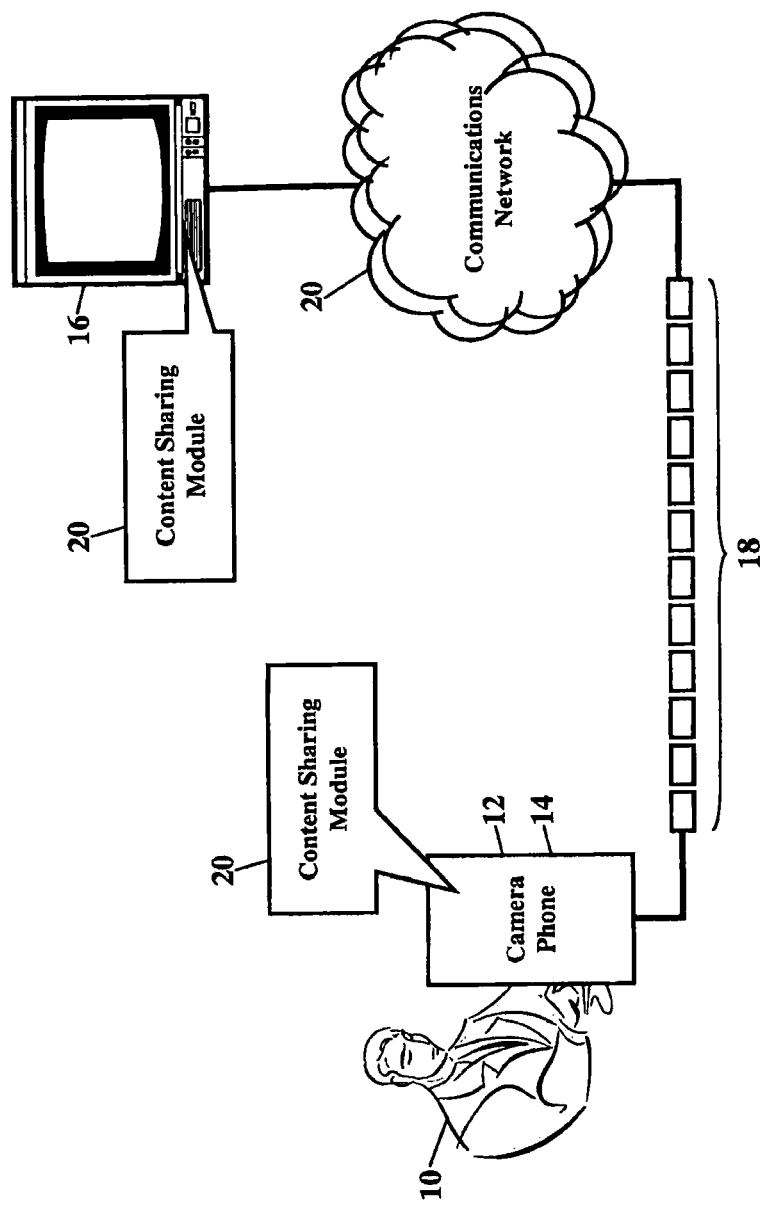
FIG. 1 is a simplified schematic illustrating the exemplary embodiments.

FIG. 1 is a simplified schematic illustrating the exemplary embodiments. These exemplary embodiments describe how one person may share content with a subscriber's media delivery device. As this patent will explain, the concepts described herein are applicable to any computer and/or mobile device. The concepts, in fact, are applicable to any media delivery device, such as a television, monitor, communications device, or processor-controlled device. The media delivery device may utilize analog circuitry or digital circuitry. The television may receive analog signals or digital signals (e.g., HDTV). The media delivery device, for example, may be a television including an encoder/decoder, such as an embedded set-top box. The term "media delivery device," however, may encompass a stand-alone set-top box that is a separate component from a conventional television. The media delivery device may also utilize any display device technology, such as a cathode-ray, a liquid crystal, a diode, micromirrors, or plasma.

As FIG. 1 illustrates, a mobile user 10 operates a mobile device 12. FIG. 1 illustrates the mobile device 12 as a camera phone 14, but the mobile device could alternatively be any communications device, such as a computer, a personal digital assistant, a pager, or any other device. The mobile user 10 desires to communicate, or share, content with the subscriber's media delivery device 16. The content may have any format or standard. The mobile user 10, for example, may wish to communicate a stream of video images, captured by the camera phone 14, with the subscriber's media delivery device 16. The mobile device 12 uses any messaging protocol to establish a session. The mobile device 12 communicates a stream 18 of data via a communications network 20. The stream 18 of data may contain any packetized data, such as "live" or real time video images, a video clip, or an image. The stream 18 of data may additionally or alternatively contain Voice-Over Internet Protocol data. The stream 18 of data may or may not include audio data. As the following paragraphs and schematics will explain, various devices (not shown for simplicity) allow the stream 18 of data to communicate to the media delivery device 16. The media delivery device 16 may then audibly and/or visually present the stream 18 of data originating from the mobile device 12.

FIGS. 2-6 are detailed schematics illustrating the exemplary embodiments. The mobile user 10 desires to communicate content to the subscriber's media delivery device 16. The media delivery device 16 includes a content sharing application 22 stored in memory 24. The media delivery device 16 also includes a processor 26 communicating with the memory 24. When the subscriber's media delivery device 16 is powered "on," the processor 26 sends a presence update message 28. The presence update message 28 indicates the media delivery device 16 is active and available to receive communications. The presence update message 28 may utilize any format or protocol, such as the SIMPLE industry standard protocol. The presence update message 28 communicates to a residential broadband gateway (RBGW) 30 via a residential network 32. The residential broadband gateway 30 is a computer device that also stores some or all portions of the content sharing application 22 in memory 34. The residential broadband gateway 30 terminates broadband facilities coming into the subscriber's premises. The residential broadband gateway 30 also provides wired and wireless interfaces for a variety of subscribed services, such as voice service, broadband Internet access service, and Internet Protocol television service. The residential network 32 is commonly called a "home network." The residential network 32, as will be later explained, is a wired and/or wireless communications network installed within the subscriber's premises. The content sharing application 22 operating in the residential broadband gateway 30 functions as a B2BUA (Back-to-Back User Agent) supporting this video sharing service. The residential broadband gateway 30 may or may not support Quality of Service (QoS) mechanisms.

The residential broadband gateway 30 updates its internal presence records. When the presence update message 28 is received, the content sharing application 22 (operating in the residential broadband gateway 30) updates its internal presence records. The residential broadband gateway 30 sends a registration message 36 to the subscriber's Mobile Session Control Infrastructure 38. The registration message 36 indicates that the media delivery device 16 is active and ready to receive video session invites.

The exemplary embodiments may utilize any messaging protocol. The registration message 36, for example, may use the Session Initiation Protocol (SIP) or the H.323 protocol. As those of ordinary skill in the art understand, Session Initiation Protocol (SIP) is the Internet Engineering Task Force's standard for multimedia conferencing over IP. The H.323 protocol originated as an International Telecommunications Union (ITU) multimedia standard and incorporates multiple protocols, including Q.931 for signaling, H.245 for negotiation, and Registration Admission and Status (RAS) for session control. Because SIP has gained greater industry acceptance, SIP will be shown and discussed, although those of ordinary skill in the art understand any messaging protocol may be used.

Figure 2:
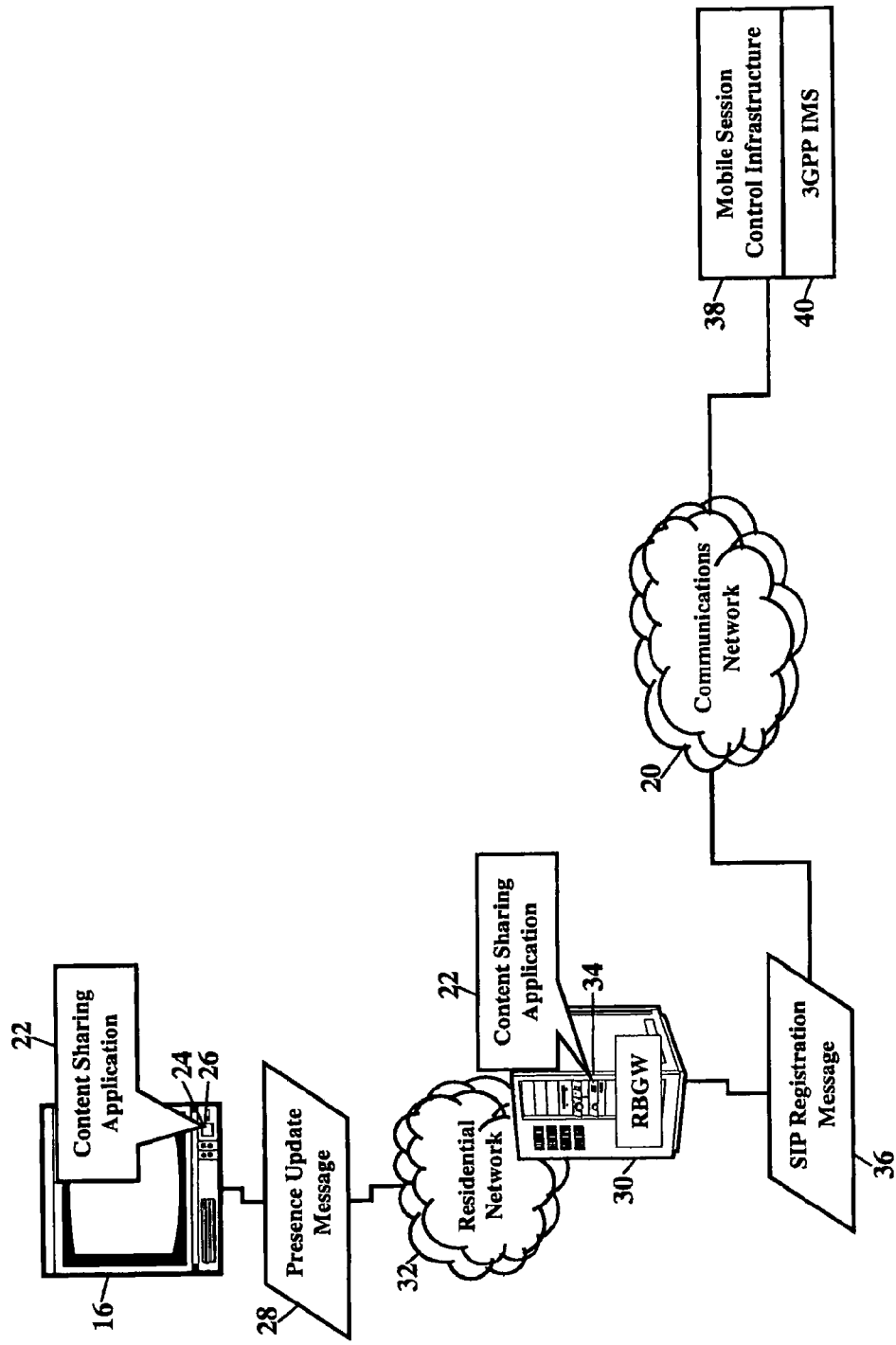
FIGS. 2-6 are detailed schematics illustrating the exemplary embodiments.

The Mobile Session Control Infrastructure 38 is known in the art. The Mobile Session Control Infrastructure 38 is an all-IP subsystem designed to facilitate delivery of IP multimedia services using the SIP signaling protocols for session initiation, modification, and termination. The Mobile Session Control Infrastructure 38 may or may not support QoS mechanisms. FIG. 2 illustrates the 3GPP (Third Generation Partnership Projects) IMS (EP Multimedia Subsystem) network 40. As those of ordinary skill in the art understand, the 3GPP has standardized the Universal Mobile Telecommunication System (UMTS) to offer the next generation of wireless services. The IMS network 40 supports traditional telephony services as well as multimedia services. Because the IMS network 40 is known to those of ordinary skill, this patent will not further describe the IMS network 40.

Figure 3:
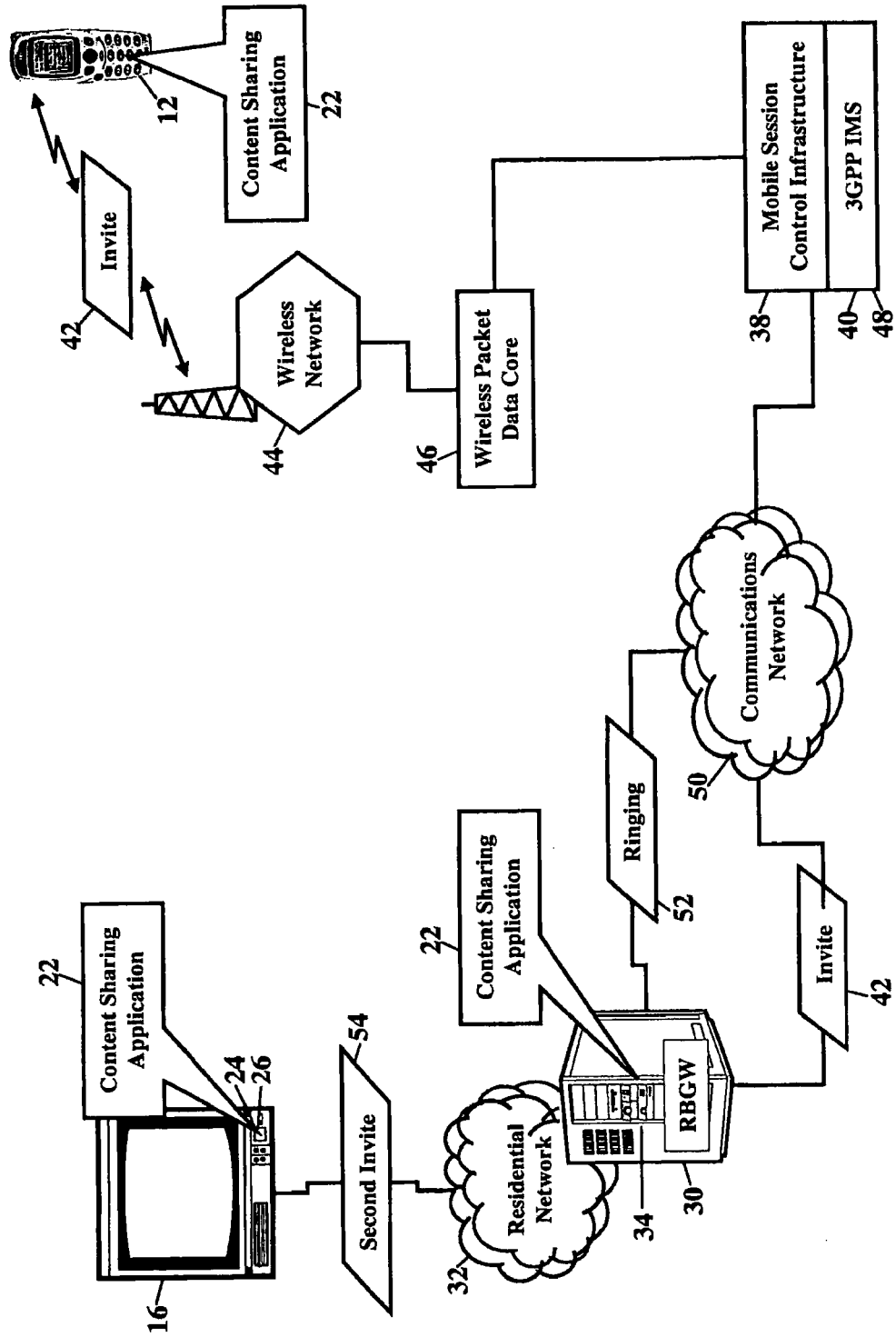

FIG. 3 is a schematic further illustrating the exemplary embodiments. The mobile user, using the mobile device 12, desires to share content with the subscriber's media delivery device 16. The mobile device 12 sends an invite message 42 to the subscriber. The invite message 42 is addressed to the subscriber, such as to the subscriber's home telephone number, home email address, or any other communications address associated with the subscriber. The invite 42, as earlier explained, may use any messaging protocol. Because SIP has gained greater industry acceptance, the invite message 42 will be shown as discussed as SIP invite message 42. The SIP invite message 42 first routes to the mobile user's home IMS network 40 via a wireless network 44 and via a wireless packet data core 46. As those of ordinary skill in the art understand, the wireless network 44 is a wireless access network of a communications service provider. The wireless network 44 includes all the network elements and equipment for the delivery of wireless services (e.g. receivers, base stations, base station controllers, transmission facilities, MSCs, HLRs, VLRs, etc.) (not shown for simplicity). The wireless network 44 may utilize any portion of the electromagnetic spectrum and any signaling standard (such as the I.E.E.E. 802 family of standards, GSM/CDMA/TDMA/WCDMA or any other cellular standard, and/or the ISM band). As those of ordinary skill in the art understand, the wireless packet data core 46 includes elements required to support wireless packet data services (such as 2.5G and/or 3G services, BLUETOOTH services, and/or the family of I.E.E.E. 802 services). These elements provide the interface between the wireless network and internal or external IP networks. The packet core may or may not support QoS mechanisms. Because both the wireless network 44 and the wireless packet data core 46 are known to those of ordinary skill, this patent will not provide a further explanation of either.

The SIP invite message 42 routes to the mobile user's home IMS network 40. The mobile user's home IMS network 40 performs an ENUM address translation and/or a DNS lookup to determine a network address of the subscriber. The mobile user's home IMS network 40 then forwards the SIP invite message 42 to that network address.

The SIP invite message 42 forwards to the subscriber. The SIP invite message 42 routes to the subscriber's home IMS network 48. The subscriber's home IMS network 48 determines the location and status of the subscriber's media delivery device 16. The subscriber's home IMS network 48 then forwards the SIP invite message 42 to the residential broadband gateway (RBGW) 30 via a communications network 50. The content sharing application 22, operating in the residential broadband gateway 30, functions as a B2BUA (Back-to-Back User Agent) supporting this content sharing service. When the content sharing application 22 receives the SIP invite message 42, the content sharing application 22 first returns a ringing message 52 to the mobile device 12. The content sharing application 22 also sends a second invite message 54 to the media delivery device 16 to initiate a session between the residential broadband gateway 30 and the media delivery device 16. The ringing message 52 and the second invite message 54 may use any messaging protocol. Because SIP has gained greater industry acceptance, the ringing message 52 and the second invite message 54 are shown utilizing SIP.

Figure 4:
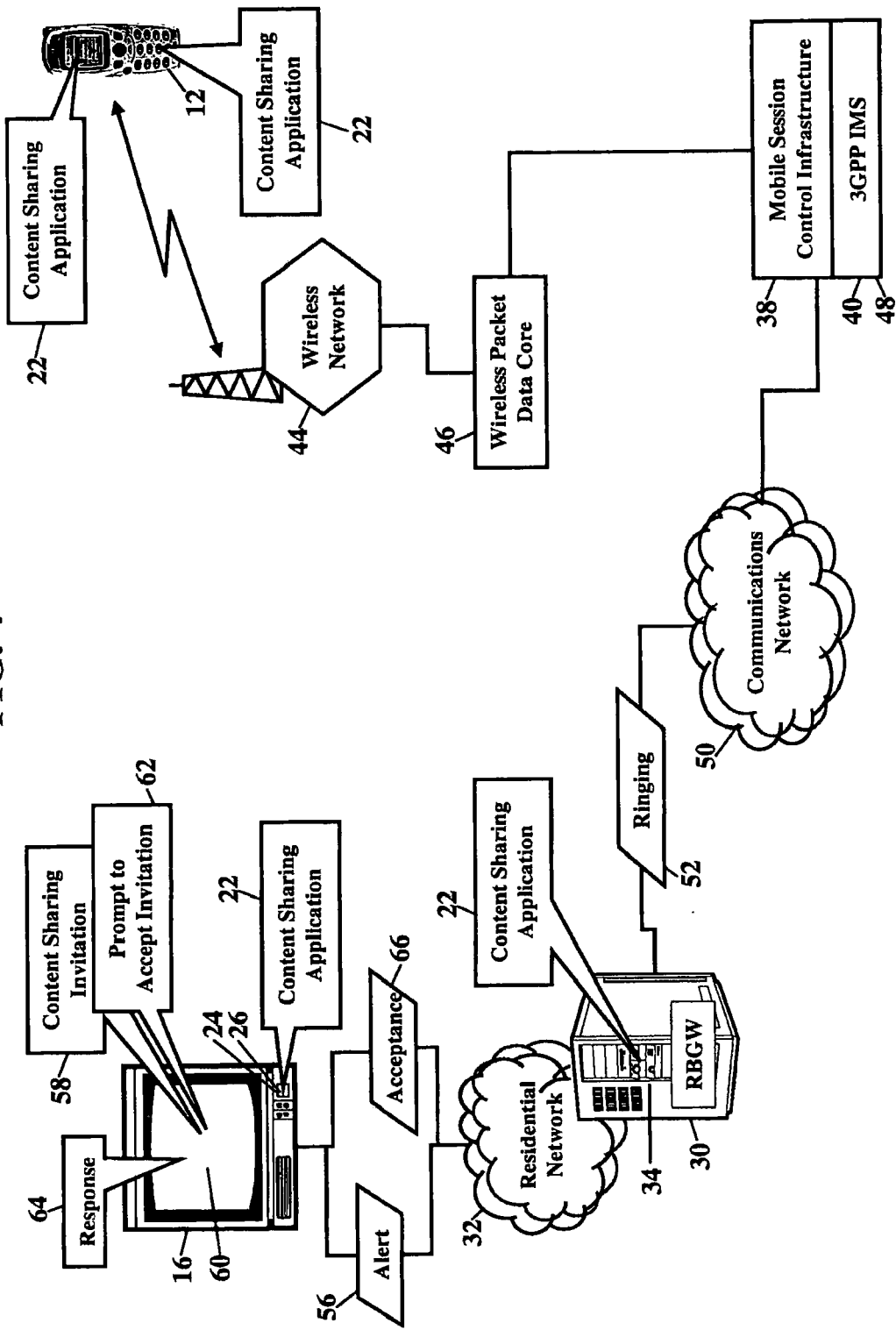

FIG. 4 is a schematic further illustrating the exemplary embodiments. The media delivery device 16 responds to the second invite message (shown as reference numeral 54 in FIG. 3). The media delivery device 16 sends an alerting message 56 in response to the second invite message. The alerting message 56 may use any messaging protocol, but SIP is shown. The processor 26 in the media delivery device may visually present a message 58 on a display device 60. The message 58 indicates the mobile user, at the mobile device 12, has requested a content sharing session with the media delivery device 16. The processor 26 may additionally or alternatively prompt 62 the subscriber to accept the invitation for the session. The subscriber responds using a button on a control panel of the media delivery device or using a button on a remote control. The subscriber may also utter a verbal response that is interpreted by the processor 26. However the subscriber responds, the processor 26 receives the subscriber's response 64 to the prompt 62. If the response 64 accepts the session invitation, then the processor 26 sends an acceptance message 66 to the residential broadband gateway 30.

Figure 5:
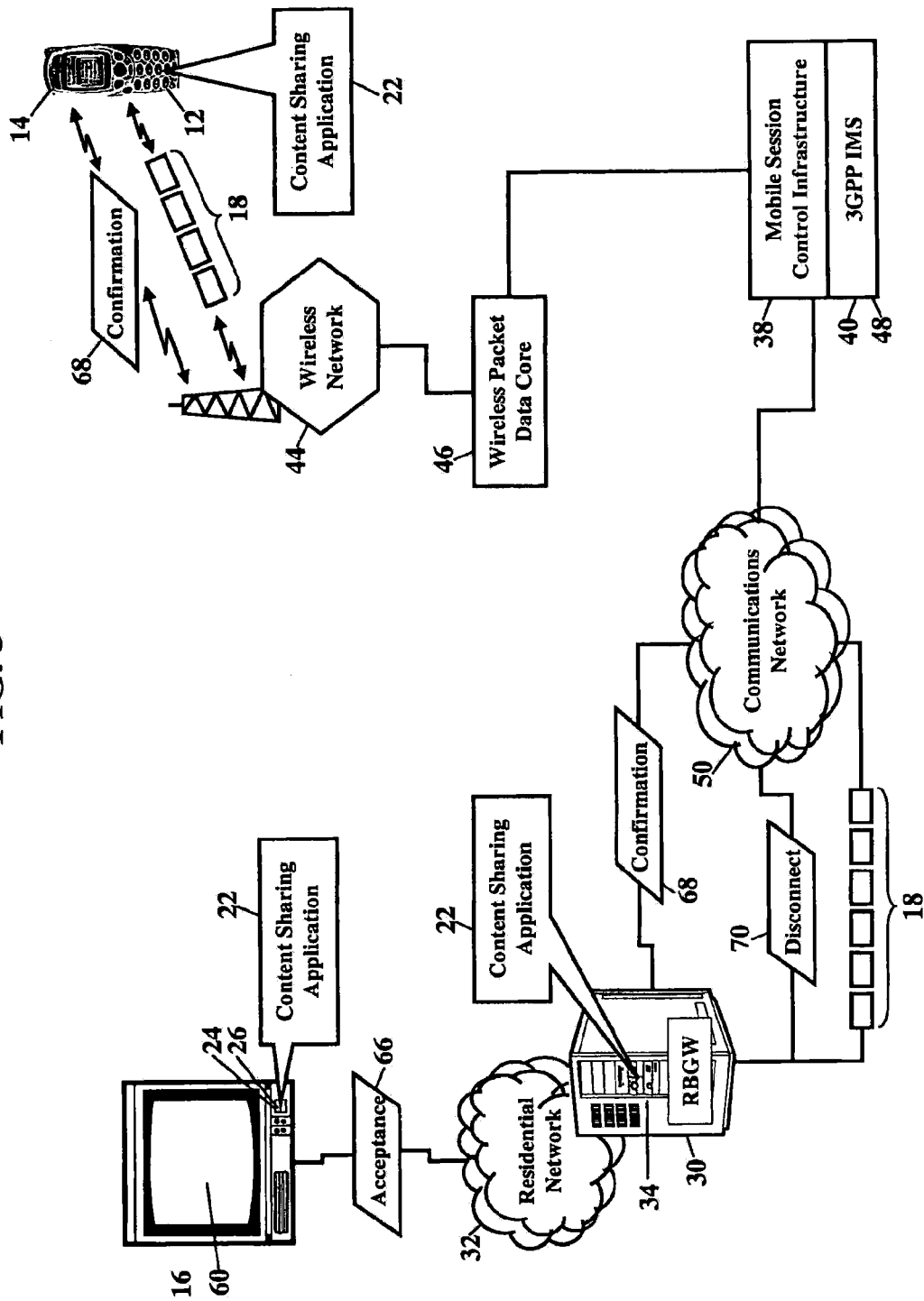

FIG. 5 is a schematic illustrating a confirmation message 68, according to the exemplary embodiments. When the residential broadband gateway 30 receives the acceptance message 66, the residential broadband gateway 30 sends the confirmation message 68. The confirmation message 68 may be any message or information that acknowledges acceptance of the session invitation. The confirmation message 68, for example, may be a SIP OK message. The confirmation message 68 routes to the mobile device 12 and indicates that the subscriber has accepted the session invitation. The mobile device 12 (such as the camera phone 14) then communicates the stream 18 of data containing any packetized data, such as "live" or real time video images, video clip(s), or image(s), and/or VoIP data. The mobile device 12, for example, may initiate an RTP/RTCP transmission between the mobile device 12 and the media delivery device 16. The media delivery device 16 then visually and/or audibly presents the shared content. When the mobile device 12 and/or the media delivery device 16 decides to end the session, either device provides a disconnect message 70 to terminate the session per standard SIP protocols.

Figure 6:
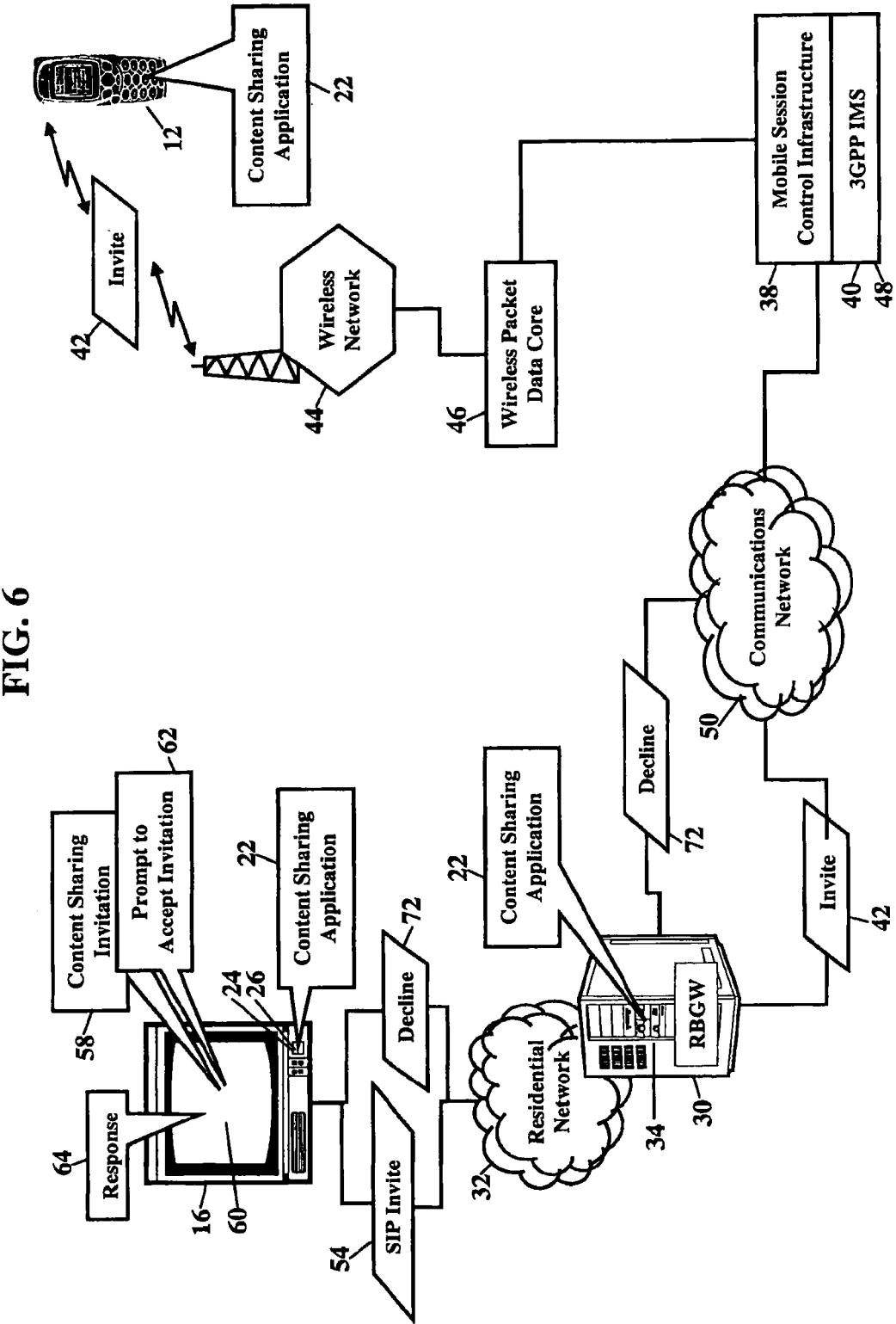
Figure 7:
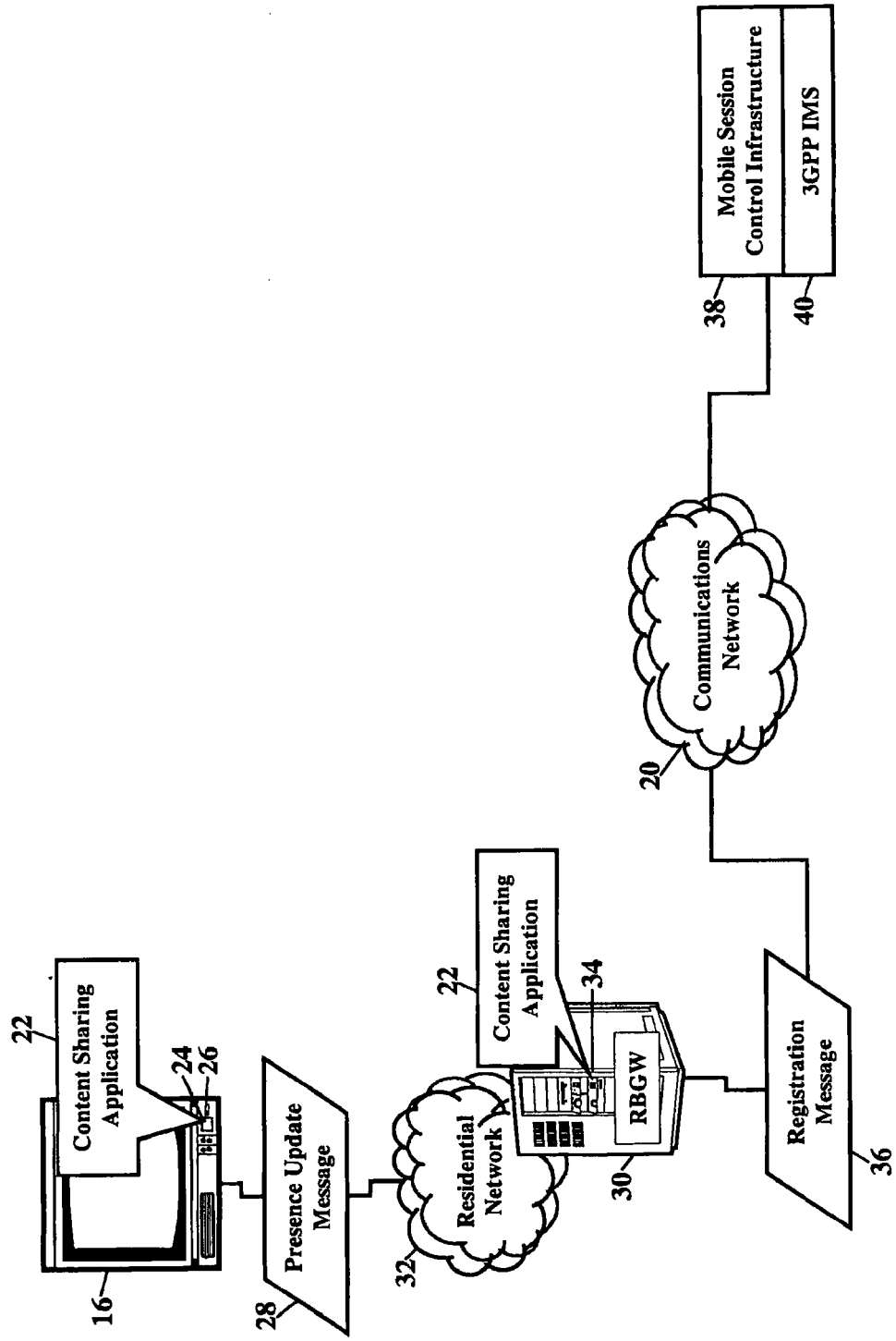
FIGS. 7-10 are detailed schematics illustrating a common home network, according to the exemplary embodiments.

FIG. 6 illustrates a decline message 72. Should the subscriber decline to accept the session invitation, FIG. 6 illustrates how the mobile device 12 is informed of the declined session. The mobile device 12, as earlier described, sends the SIP invite message 42 to the subscriber. The SIP invite message 42 routes to the subscriber's residential broadband gateway (RBGW) 30 via the communications network 50. The content sharing application 22, operating in the residential broadband gateway 30, sends the second SIP invite message 54 to the media delivery device 16 to initiate the session between the residential broadband gateway 30 and the media delivery device 16. The processor 26 in the media delivery device 16 prompts the subscriber to accept the invitation for the session. The subscriber responds and the processor 26 receives the subscriber's response 64 to the prompt 62. Here the subscriber has declined the session invitation, so the processor 26 sends the decline message 72. The decline message 72 routes to the residential broadband gateway 30 via the residential network 32. The decline message 72 continues routing to the mobile device 12 via the communications network 50 and via the wireless network 44. The decline message 72 indicates that the subscriber has declined the session invitation.

The communications networks described herein may utilize any wired and/or wireline technology. The communications network 20, the residential network 32, and the communications network 50 may be a cable network operating in the radio-frequency domain and/or the Internet Protocol (IP) domain. Either communications network, however, may also include a distributed computing network, such as the Internet (sometimes alternatively known as the "World Wide Web"), an intranet, a local-area network (LAN), and/or a wide-area network (WAN). The communications networks may include coaxial cables, copper wires, fiber optic lines, and/or hybrid-coaxial lines. The communications networks may even include wireless portions utilizing any portion of the electromagnetic spectrum and any signaling standard (such as the I.E.E.E. 802 family of standards, GSM/CDMA/TDMA/WCDMA or any cellular standard, and/or the ISM band). Either communications network may be a broadband data transport network that supports IP protocols. Either communications network may be a broadband access network (BBAN) that connects to the subscriber's premises. Either communications network may support broadband access (such as ADSL technology, cable technology, and/or fiber technology). Either communications network, in fact, may support any broadband access technology that supports and/or delivers broadband services to the subscriber's premises. Either communications network may or may not support QoS.

FIGS. 7-10 are detailed schematics illustrating more exemplary embodiments. These exemplary embodiments illustrate a scenario in which both the mobile user and the subscriber are recognized by the same home network. This scenario has some similarities, and some differences, to that discussed with reference to FIGS. 2-6. The similar portions will be quickly reviewed. When the subscriber's media delivery device 16 is powered "on," as earlier explained, the processor 26 sends the presence update message 28. The presence update message 28 indicates the media delivery device 16 is active and available to receive the stream 18 of data. The presence update message 28 communicates to the residential broadband gateway (RBGW) 30 via the residential network 32. When the presence update message 28 is received, the content sharing application 22 (operating in the residential broadband gateway 30) updates its internal presence records. The residential broadband gateway 30 sends the SIP registration message 36 to the subscriber's Mobile Session Control Infrastructure 38. The SIP registration message 36 indicates that the media delivery device 16 is active and ready to receive video session invites.

Figure 8:
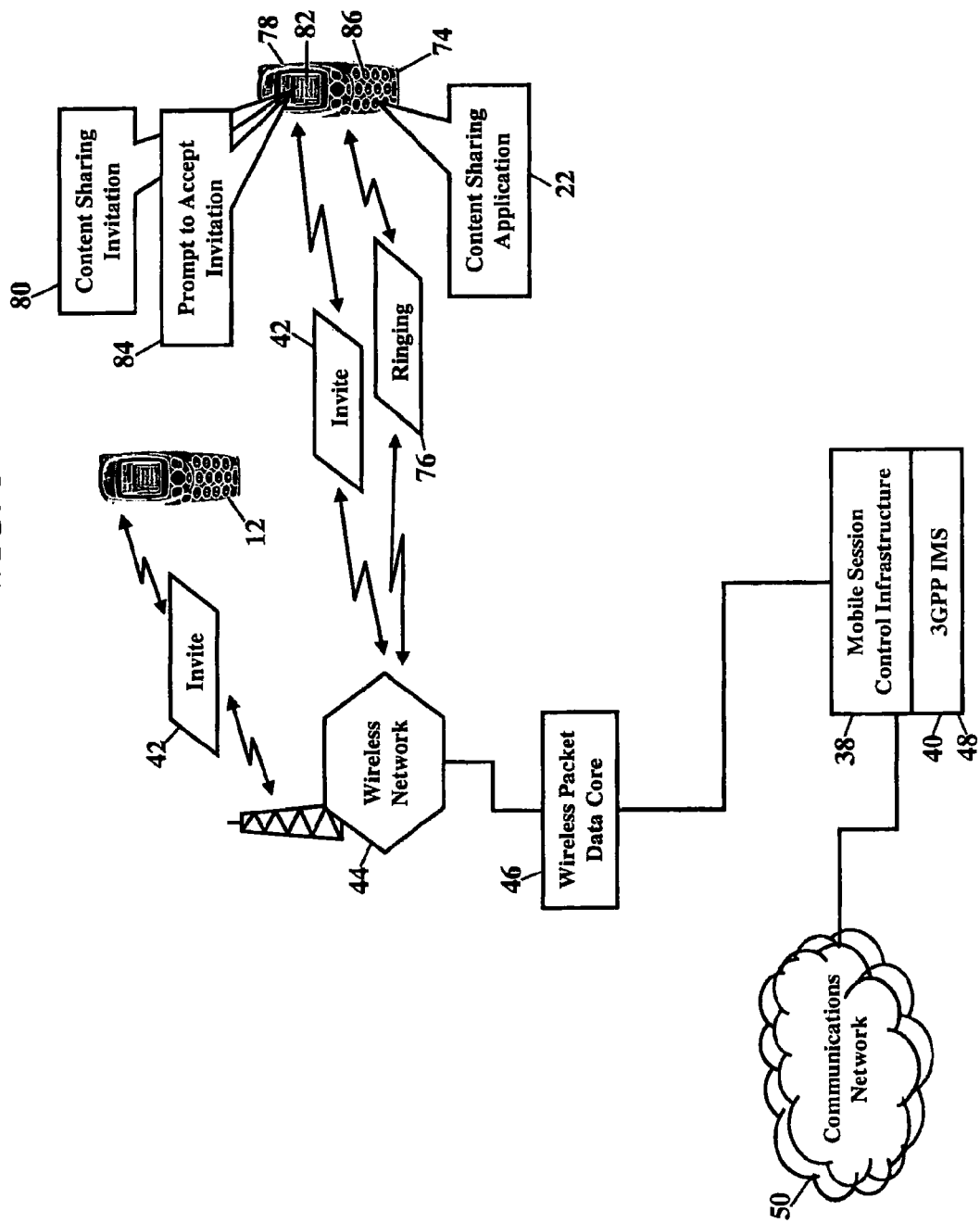

FIG. 8 is a schematic illustrating the SIP invite message 42, according to the exemplary embodiments. The mobile user desires to share content between the mobile device 12 and the subscriber's media delivery device 16. The mobile device 12 sends the SIP invite message 42 to the subscriber. The SIP invite message 42 is addressed to the subscriber, such as to the subscriber's mobile telephone number, home telephone number, home email address, or any other communications address associated with the subscriber. The SIP invite message 42 routes to the mobile user's home IMS network 40. Here the SIP invite message 42 is addressed to the subscriber's mobile telephone number, so the home IMS network 40 recognizes the subscriber's communications address as one of its own mobile subscribers. The home IMS network 40 determines the location and status of the subscriber's mobile terminal 74 and forwards the SIP invite message 42 to the subscriber's mobile terminal 74.

The SIP invite message 42 forwards to the subscriber's mobile terminal 74. When the subscriber's mobile terminal 74 receives the SIP invite message 42, the subscriber's mobile terminal 74 provides an expected response per the SIP protocol, such as a SIP ringing message 76. The subscriber's mobile terminal 74 also provides an audible and/or visual indication or alert of the mobile user's invitation to share video. A processor 78 operating in the mobile terminal 74 audibly/visually presents a message 80 on a display device 82. The message 80 indicates the mobile user, at the mobile device 12, has requested a content sharing session with the subscriber's mobile terminal 74. The processor 78 may additionally or alternatively prompt 84 the subscriber to accept the invitation for the session. The subscriber responds using a button or command on a keypad 86. The subscriber may also utter a verbal response that is interpreted by the processor 78.

Here, however, the subscriber prefers to view the shared content on the subscriber's media delivery device 16. The SIP invite message 42 forwarded to the subscriber's mobile terminal 74, but the subscriber does not wish to view the shared content on the mobile terminal 74. Perhaps the mobile terminal's video capabilities and/or audio capabilities are not desirable for video. Perhaps the environment is not conducive to use of the mobile terminal 74. Whatever the reasons, the subscriber prefers instead to view the shared content on the subscriber's alternate media delivery device.

Figure 9:
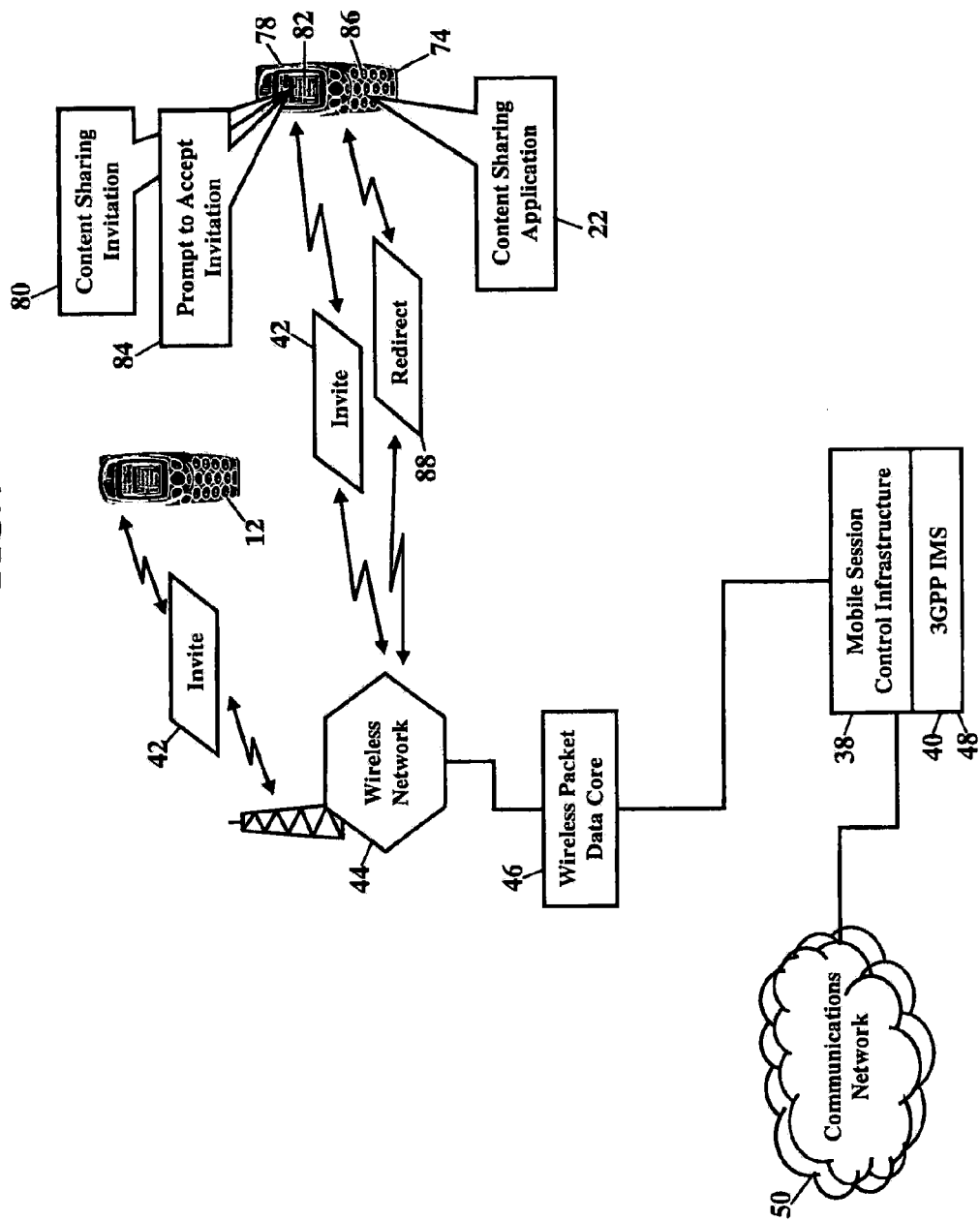

FIG. 9 is a schematic illustrating a redirect message 88, according to the exemplary embodiments. The processor 78 prompted the subscriber to accept the invitation, but the subscriber prefers instead to view the shared content on the subscriber's media delivery device 16. The subscriber, then, responds to the prompt 84 by redirecting the session invitation to an alternate communications address. The alternate communications address may be any address of any other network location. The alternate communications address, for example, may be a network address of the residential broadband gateway (shown as reference numeral 30 in FIGS. 2-7), a network address of a television or other media delivery device (shown as reference numeral 16 in FIGS. 1-7), a network address of a remote storage device, or any other destination. Here the alternate communications address is described as a home email address for the subscriber. The processor 78 sends the redirect message 88 to the mobile user's home IMS network 40.

The mobile user's home IMS network 40 receives the redirect message 88. The redirect message 88 instructs the mobile user's home IMS network 40 to redirect the session invitation to the subscriber's home email address. The mobile user's IMS network 40 performs a Domain Name Server (DNS) lookup to determine the network address associated with the subscriber's home IMS network. The mobile user's home IMS network 40 then forwards the SIP invite message 42 to the network address associated with the subscriber's home IMS network.

Figure 10:
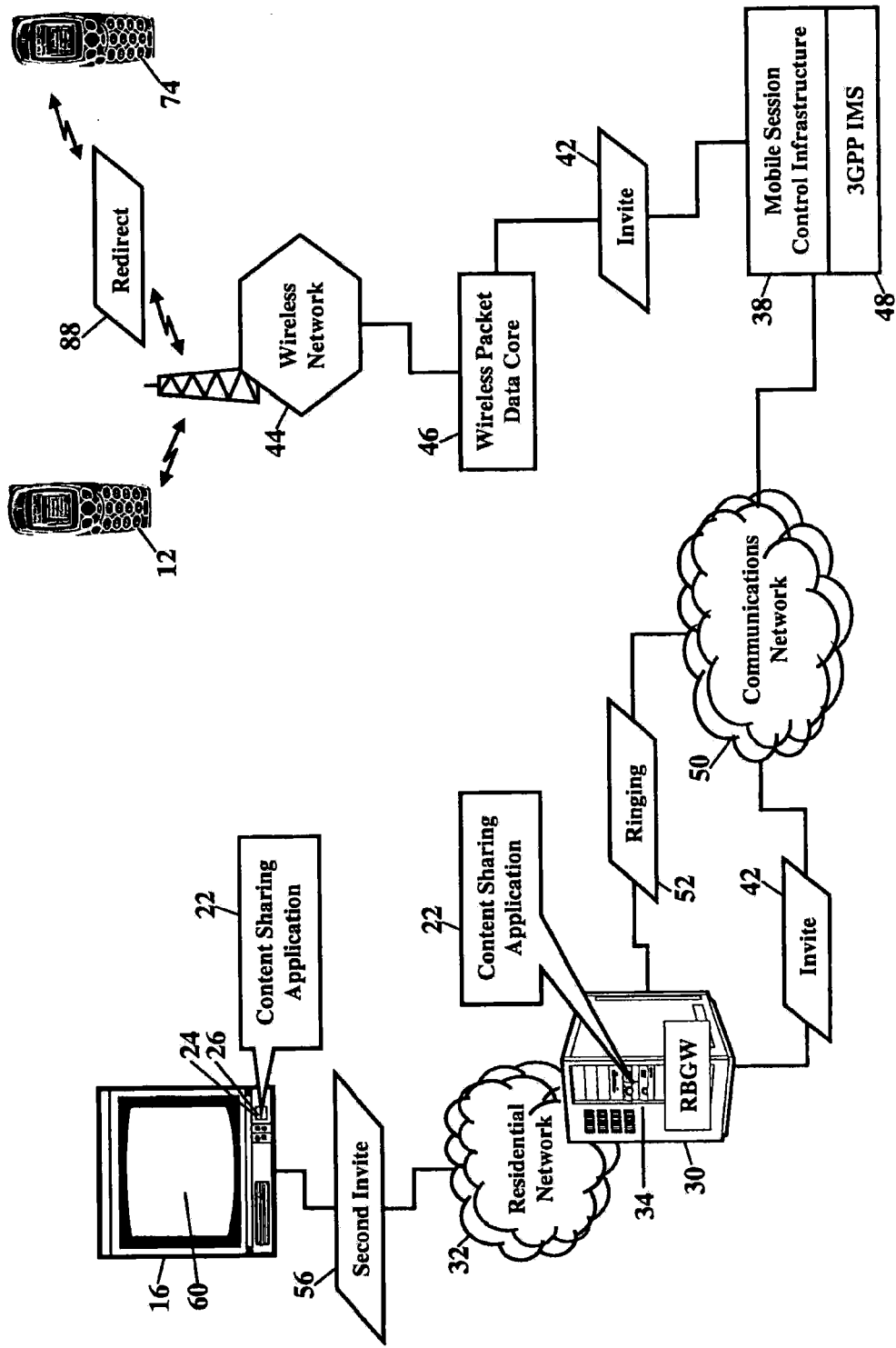

FIG. 10 is a schematic illustrating the subscriber's home IMS network 48, according to the exemplary embodiments. The SIP invite message 42 routes to the subscriber's home IMS network 48. The subscriber's home IMS network 48 determines the location and status of the subscriber's media delivery device 16. The subscriber's home IMS network 48 then forwards the SIP invite message 42 to the residential broadband gateway (RBGW) 30 via the communications network 50. The content sharing application 22, operating in the residential broadband gateway 30, receives the SIP invite message 42. The content sharing application 22 first returns the SIP ringing message 52 to the mobile device 12. The content sharing application 22 also sends the second SIP invite message 54 to the media delivery device 16 to initiate the session between the residential broadband gateway 30 and the media delivery device 16.

The content sharing session then continues as previously explained. The media delivery device 16 sends the SIP alerting message (shown as reference numeral 56 in FIG. 4) in response to the second SIP invite message 54. The processor 26, as earlier described, may present the message (shown as reference numeral 58 in FIG. 4) that indicates the mobile user, at the mobile device 12, has requested a video sharing session with the media delivery device 16. The processor 26 may additionally or alternatively prompt (shown as reference numeral 62 in FIG. 4) to accept the invitation for the session. The processor 26 sends the acceptance message (shown as reference numeral 66 in FIG. 4) to the residential broadband gateway 30, and the acceptance message accepts the session invitation. When the residential broadband gateway 30 receives the acceptance message, the residential broadband gateway 30 sends the confirmation message (shown as reference numeral 68 in FIG. 5). The confirmation message routes to the mobile device 12 and indicates that the media delivery device 16 has accepted the session invitation. The mobile device 12 then communicates the stream of data (shown as reference numeral 18 in FIG. 5) to the residential broadband gateway 30. The residential broadband gateway 30 then forwards the stream of data during a session with the media delivery device 16.

Figure 11:
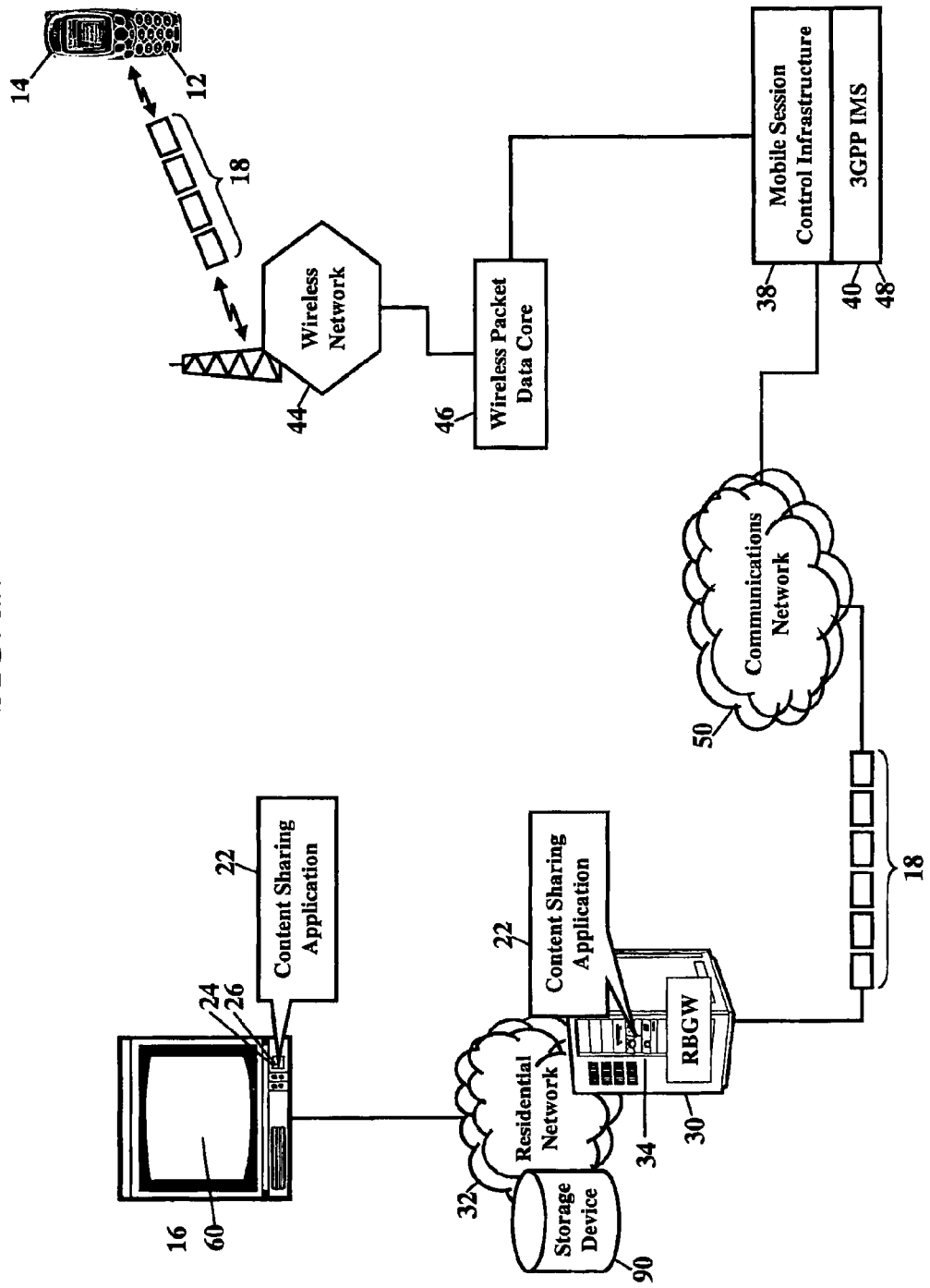
FIG. 11 is a schematic illustrating storage of shared content, according to more of the exemplary embodiments.

FIG. 11 is a schematic illustrating storage of shared content, according to more of the exemplary embodiments. Here the residential broadband gateway (RBGW) 30 communicates the shared content to a storage device or memory location. When the mobile user desires to share content with the subscriber, a session is established between the mobile device 12 and the residential broadband gateway 30. Ordinarily the residential broadband gateway 30 then forwards the stream 18 of data during a session with the media delivery device 16. Here, however, the residential broadband gateway (RBGW) 30 communicates the stream 18 of data to a storage device 90 communicating with the residential network 32. The residential broadband gateway 30 may additionally or alternatively store the stream 18 of data in the memory 34.

Suppose the media delivery device 16 is not available. Perhaps the media delivery device 16 is not powered "on." Perhaps the media delivery device 16 is already engaged in a session. Perhaps the media delivery device 16 is malfunctioning. Whatever the reason, the media delivery device 16 may not be available for a session with the mobile device 12. If the residential broadband gateway (RBGW) 30 is available, however, the mobile device 12 could still establish a session. When the residential broadband gateway 30 receives the stream 18 of data, the residential broadband gateway 30 may then locally store the stream 18 in the local memory location 34. The residential broadband gateway 30 may additionally or alternatively remotely store the stream 18 at the storage device 90. So, even if the media delivery device 16 is not available for a session, the residential broadband gateway 30 may itself establish a session and receive the stream 18 of data. Because the residential broadband gateway 30 locally and/or remotely stores the stream 18, the shared content can be retrieved at a later time.

Figure 12:
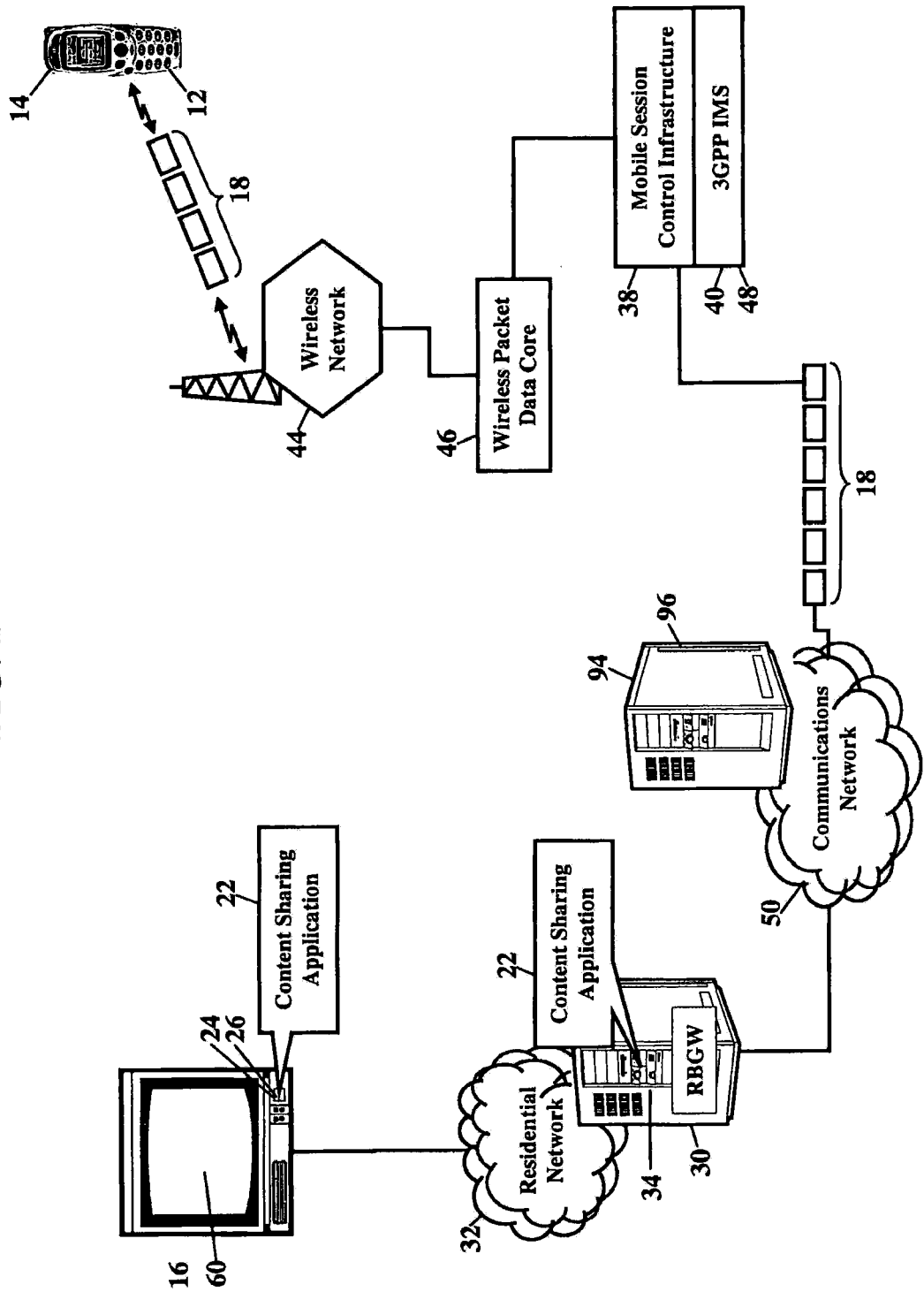
FIG. 12 is a schematic illustrating network storage of shared content, according to even more of the exemplary embodiments.

FIG. 12 is a schematic illustrating network storage of shared content, according to even more of the exemplary embodiments. Here the shared content from the mobile device 12 is stored at a network memory location 94. If the subscriber's residential broadband gateway (RBGW) 30 is unavailable, no session may be established with the subscriber's media delivery device 16. Even if the subscriber's residential broadband gateway (RBGW) 30 is unavailable, a session may still be established with the network memory location 94, such as a server 96. A session is established between the mobile device 12 and the server 96, and the server 96 receives and stores the stream 18 of data. The subscriber may then later retrieve the shared content by establishing a session or other communication with the server 96.

Figure 13:
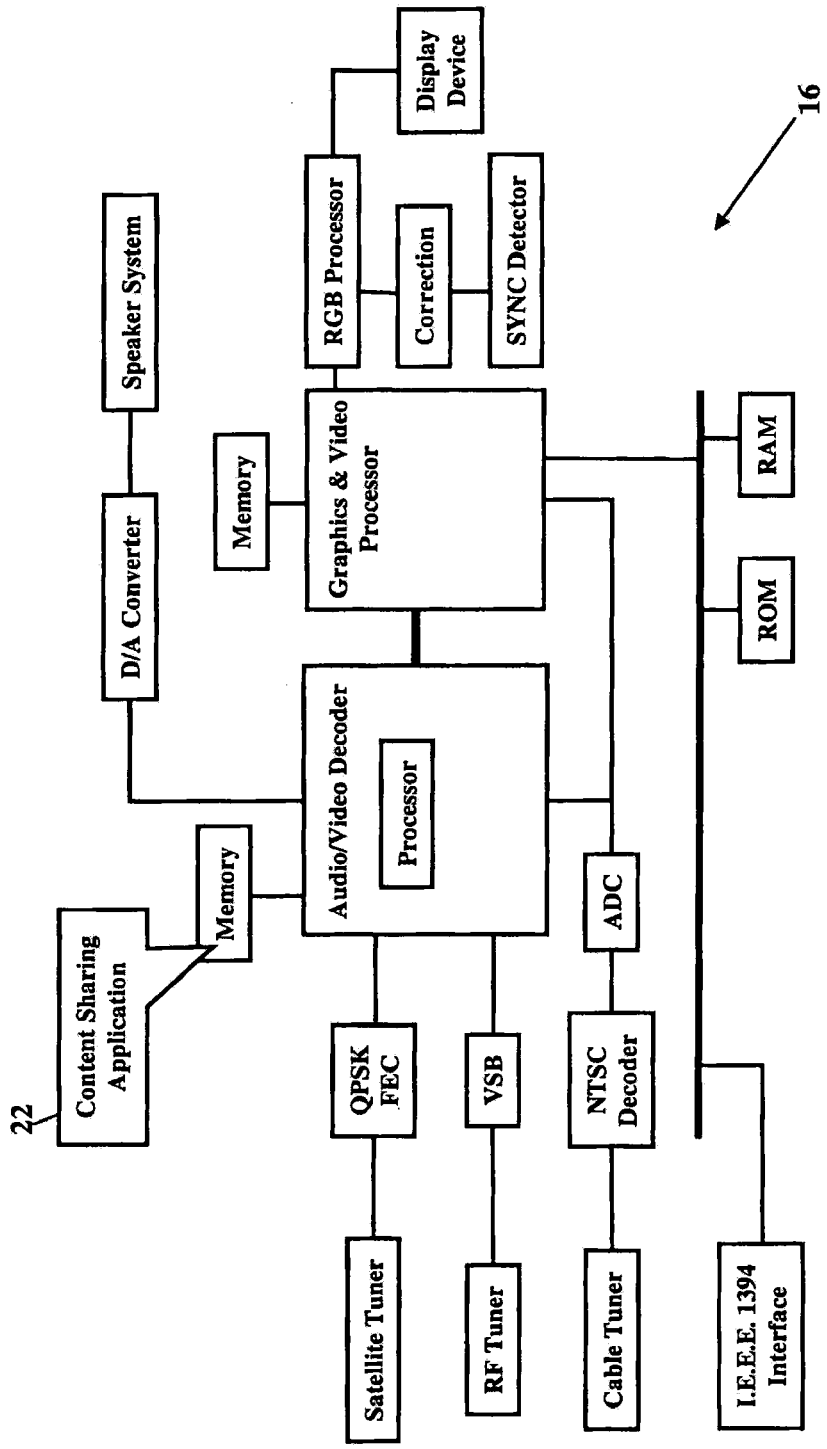
FIG. 13 is a block diagram of a television, according to still more of the exemplary embodiments.
Figure 15:
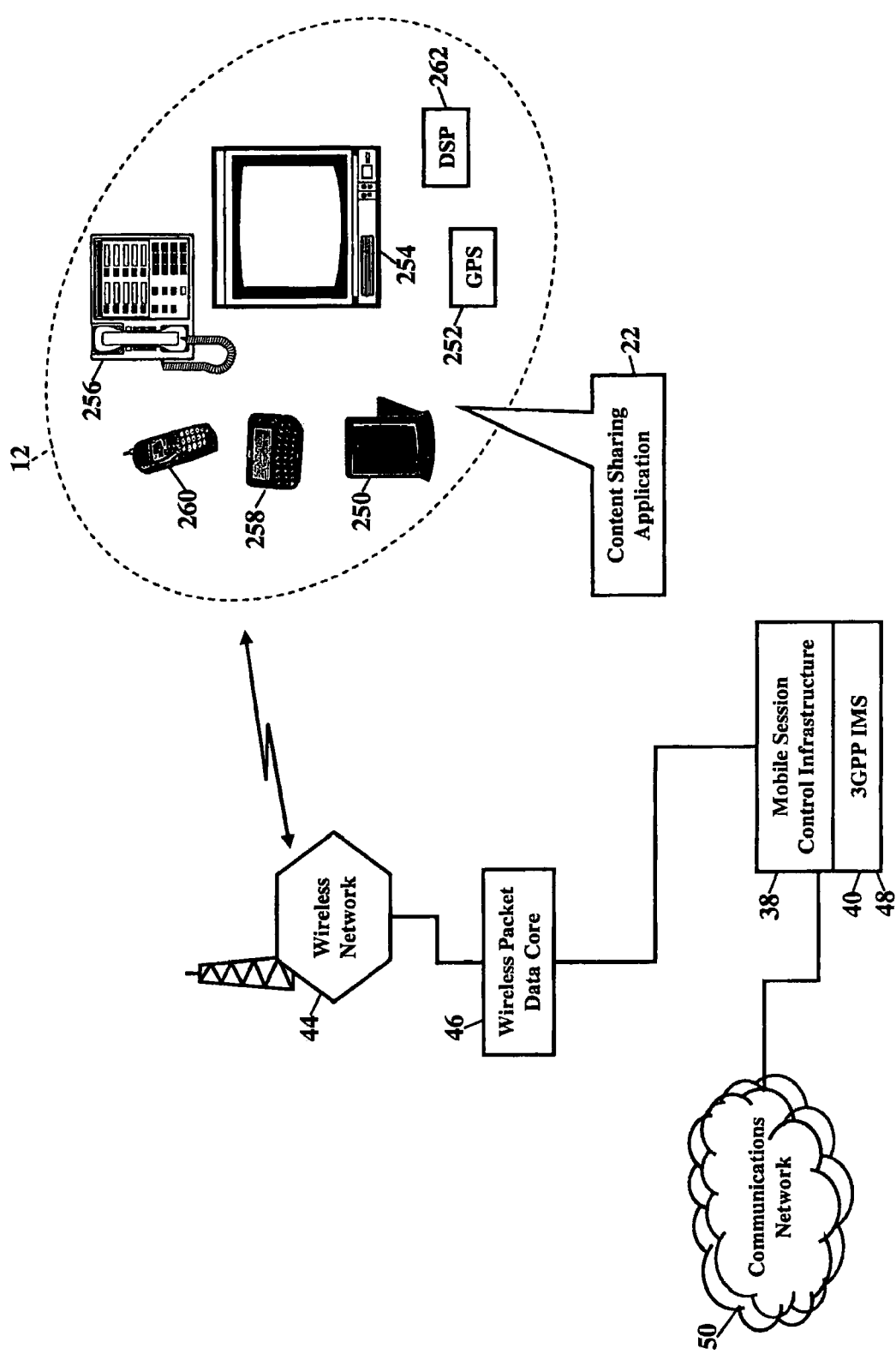
FIG. 15 is a schematic illustrating the content sharing application alternatively or additionally operating within various other mobile devices.

FIG. 13 is a block diagram of the media delivery device 16, according to yet more of the exemplary embodiments. Here the media delivery device 16 is shown as a digital high definition television (HDTV) system, yet the concepts described herein are applicable to any television design. The concepts, for example, are applicable to analog circuitry, digital circuitry, analog signals, and/or or digital signals. The television may include an encoder/decoder, such as an embedded set-top box. The term "television," however, may encompass a stand-alone set-top box that is a separate component from the television. The television may also utilize any display device technology, such as a cathode-ray, a liquid crystal, a diode, digital micromirror, light processor, or plasma. The content sharing application 22 may be stored in any memory location or device in the television 16. FIG. 15, though, is only a simplified block diagram. The operating and engineering principles are already known in the art and will not be repeated here. If, however, the reader desires more information on the television, the reader is directed to the following sources: MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004), with each incorporated herein by reference.

Figure 14:
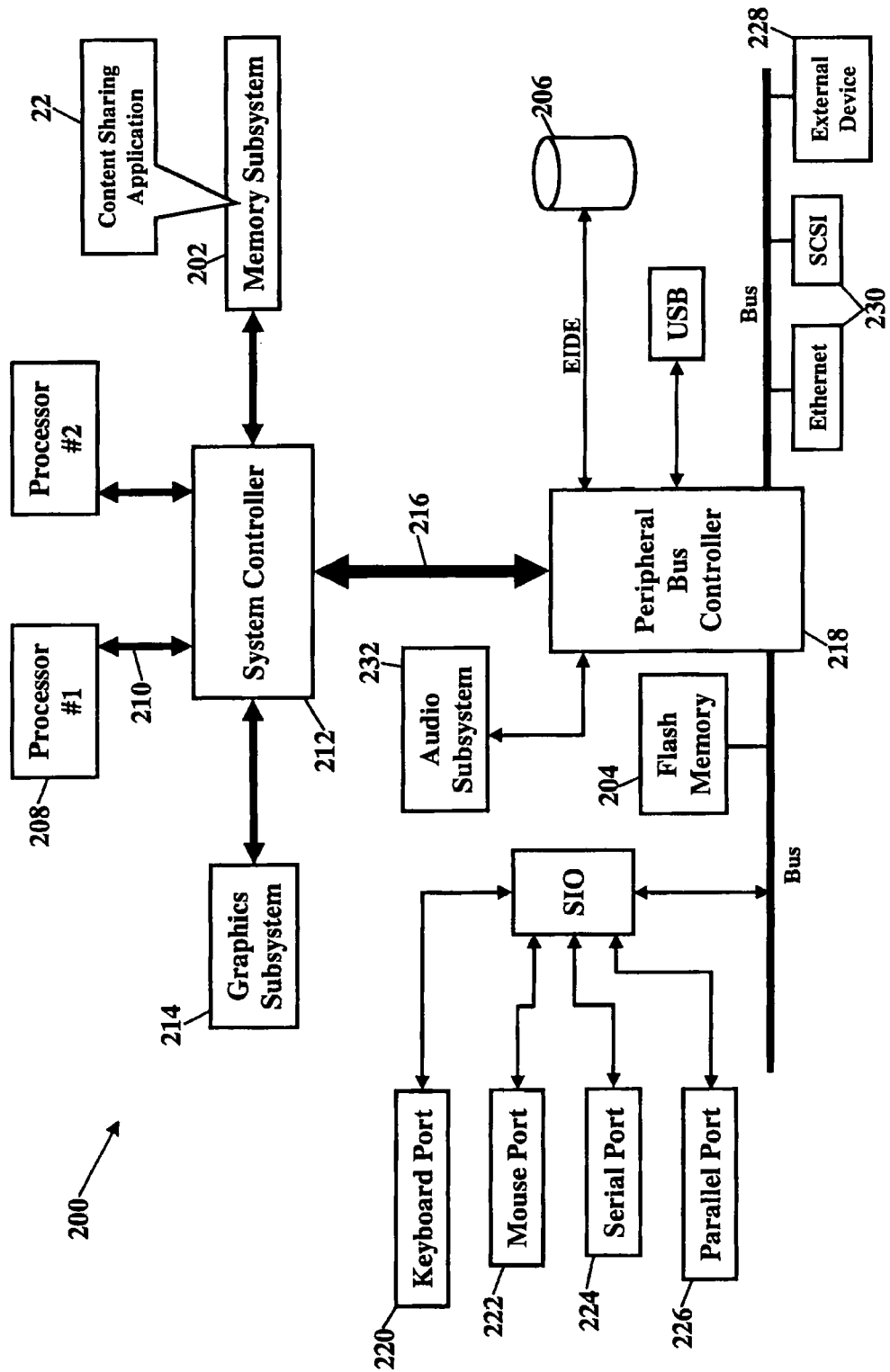
FIG. 14 depicts a content sharing application residing in a computer system, according to yet more exemplary embodiments.

FIG. 14 depicts another possible operating environment for the exemplary embodiments. FIG. 14 is a block diagram showing the content sharing application 22 residing in a computer system 200 (such as the residential broadband gateway 30, the storage device 90, the network memory location 94, or the server 96). FIG. 14, however, may also represent a block diagram of the mobile device 12 or of the media delivery device 16. FIG. 14, in fact, is a block diagram of any computer, communications device, or processor-controlled device. The content sharing application 22 operates within a system memory device. The content sharing application 22, for example, is shown residing in a memory subsystem 202. The content sharing application 22, however, could also reside in flash memory 204 or peripheral storage device 206. The computer system 200 also has one or more central processors 208 executing an operating system. The operating system, as is well known, has a set of instructions that control the internal functions of the computer system 200. A system bus 210 communicates signals, such as data signals, control signals, and address signals, between the central processor 208 and a system controller 212. The system controller 212 provides a bridging function between the one or more central processors 208, a graphics subsystem 214, the memory subsystem 202, and a PCI (Peripheral Controller Interface) bus 216. The PCI bus 216 is controlled by a Peripheral Bus Controller 218. The Peripheral Bus Controller 218 is an integrated circuit that serves as an input/output hub for various peripheral ports. These peripheral ports could include, for example, a keyboard port 220, a mouse port 222, a serial port 224, and/or a parallel port 226 for a video display unit, one or more external device ports 228, and networking ports 230 (such as USB, SCSI, or Ethernet). The Peripheral Bus Controller 218 could also include an audio subsystem 232. Those of ordinary skill in the art understand that the program, processes, methods, and systems described herein are not limited to any particular computer system or computer hardware.

One example of the central processor 208 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). The central processor 208 may also represent a digital signal processor. Those skilled in the art further understand that the program, processes, methods, and systems described herein are not limited to any particular manufacturer's central processor.

According to an exemplary embodiment, the WINDOWS® operating system may be used (WINDOWS® is a registered trademark of Microsoft Corporation, One Microsoft Way, Redmond Wash. 98052-6399, 425.882.8080, www.Microsoft.com). Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 202, flash memory 204, or peripheral storage device 206) may also contain an application program. The application program cooperates with the operating system and with a video display unit (via the serial port 224 and/or the parallel port 226) to provide a Graphical User Interface (GUI). The Graphical User Interface typically includes a combination of signals communicated along the keyboard port 220 and the mouse port 222. The Graphical User Interface provides a convenient visual and/or audible interface with a user of the computer system 200.

FIG. 15 is a schematic illustrating still more exemplary embodiments. FIG. 15 illustrates that the content sharing application 22 may alternatively or additionally operate within various other mobile devices 12. FIG. 15, for example, illustrates that the content sharing application 22 may entirely or partially operate within a personal digital assistant (PDA) 250, a Global Positioning System (GPS) device 252, an interactive television 254, an Internet Protocol (IP) phone 256, a pager 258, a cellular/satellite phone 260, or any computer system and/or communications device utilizing a digital signal processor (DSP) 262. The mobile device 12 may also include watches, radios, vehicle electronics, clocks, printers, gateways, and other apparatuses and systems.

Figure 16:
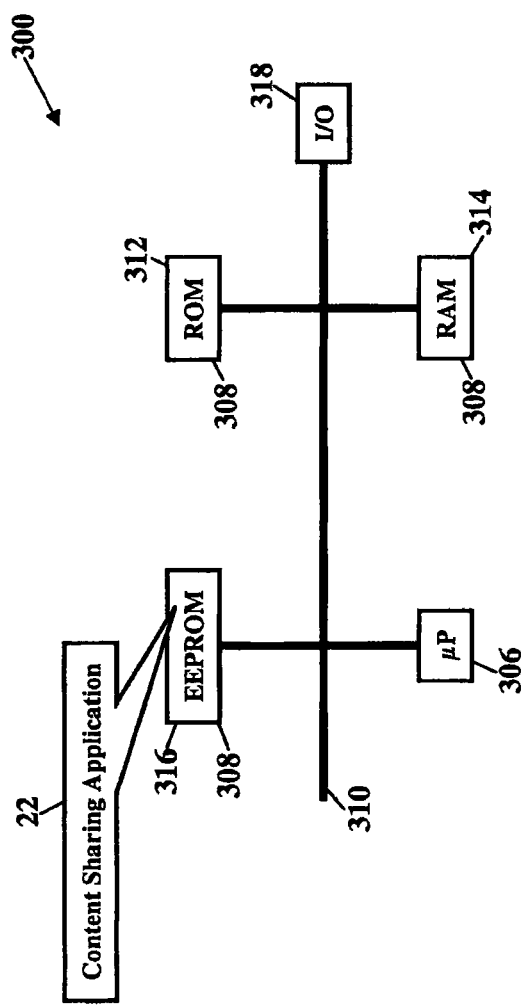

FIGS. 16-19 are schematics further illustrating the mobile device, according to the exemplary embodiments. FIG. 16 is a block diagram of a Subscriber Identity Module 300, while FIGS. 17 and 18 illustrate, respectively, the Subscriber Identity Module 300 embodied in a plug 302 and the Subscriber Identity Module 300 embodied in a card 304. As those of ordinary skill in the art recognize, the Subscriber Identity Module 300 may be used in conjunction with many mobile devices (such as the mobile communications devices 12 shown in FIG. 15). The Subscriber Identity Module 300 stores user information (such as the user's International Mobile Subscriber Identity, the user's K.sub.i number, and other user information), and any portion of the content sharing application 22. As those of ordinary skill in the art also recognize, the plug 302 and the card 304 each interface with the communications device according to GSM Standards 2.17 and 11.11 and ISO Standard 7816, with each incorporated herein by reference. The GSM Standard 2.17 is formally known as "European digital cellular telecommunications system (Phase 1); Subscriber Identity Modules, Functional Characteristics (GSM 02.17 V3.2.0 (1995-01))." The GSM Standard 11.11 is formally known as "Digital cellular telecommunications system (Phase 2+) (GSM); Specification of the Subscriber Identity Module—Mobile Equipment (Subscriber Identity Module—ME) interface (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "Information technology—Identification cards—Integrated circuit(s) cards with contacts," and the standard is available from the International Organization for Standardization (ISO) (1, rue de Varembe, Case, postale 56CH-1211 Geneva 20, Switzerland, Telephone +41 22 749 01 11, Telefax +41 22 733 34 30, www.iso.org).

FIG. 16 is a block diagram of the Subscriber Identity Module 300, whether embodied as the plug 302 of FIG. 17 or as the card 304 of FIG. 18. Here the Subscriber Identity Module 300 comprises a microprocessor 306 (.mu.P) communicating with memory modules 308 via a data bus 310. The memory modules may include Read Only Memory (ROM) 312, Random Access Memory (RAM) and or flash memory 314, and Electrically Erasable-Programmable Read Only Memory (EEPROM) 316. The Subscriber Identity Module 300 stores some or all of the content sharing application 22 in one or more of the memory modules 308. FIG. 18 shows the content sharing application 22 residing in the Erasable-Programmable Read Only Memory 316, yet the content sharing application 22 could alternatively or additionally reside in the Read Only Memory 312 and/or the Random Access/Flash Memory 314. An Input/Output module 318 handles communication between the Subscriber Identity Module 300 and the mobile device. As those skilled in the art will appreciate, there are many suitable ways for implementing the operation and physical/memory structure of the Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 19:
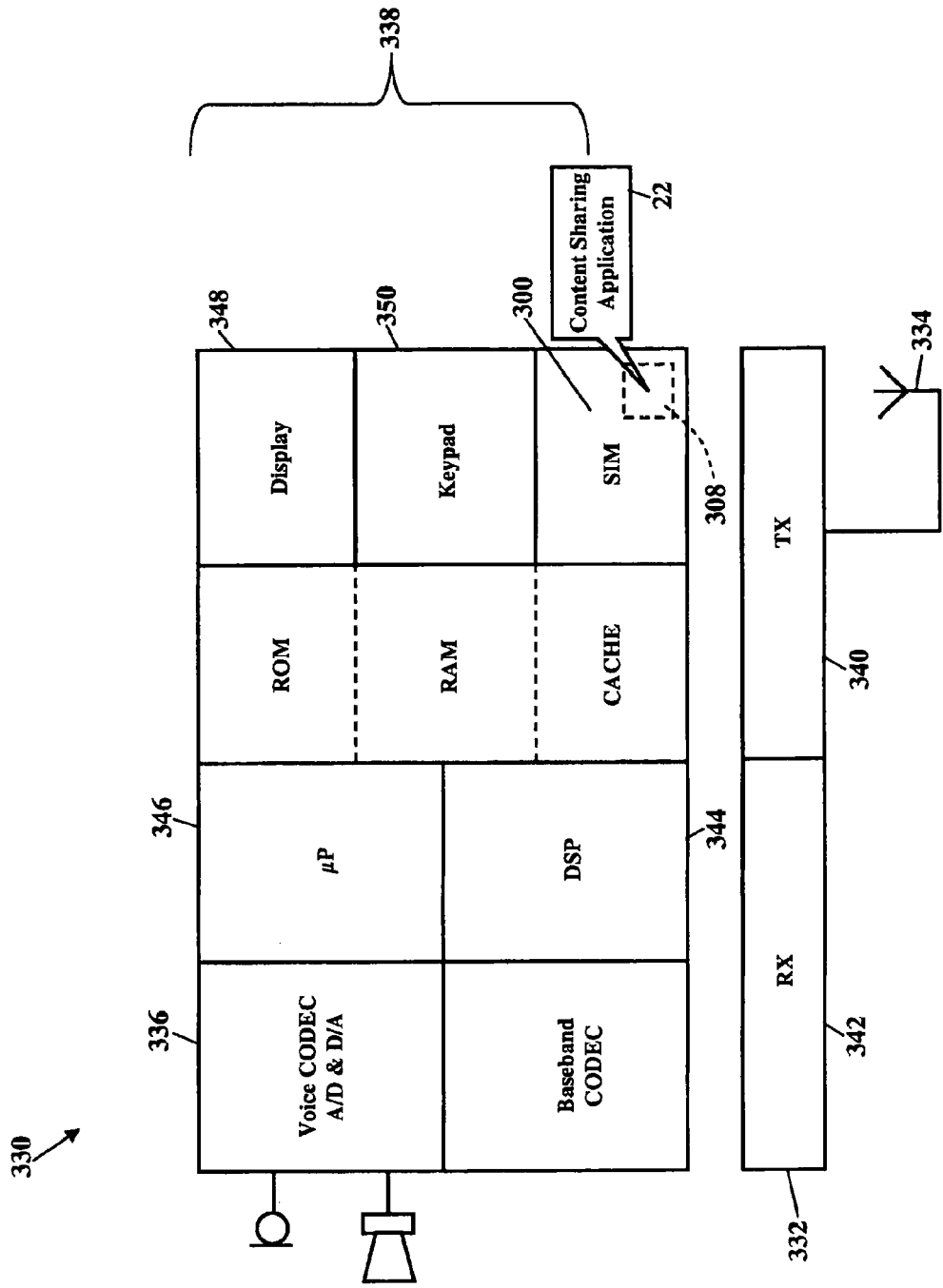

FIG. 19 is a schematic further illustrating other media delivery devices and mobile devices for sharing content, according to the exemplary embodiments. FIG. 19 is a block diagram of another mobile device 330 utilizing any portion of the content sharing application 22. Here the mobile device 330 comprises a radio transceiver unit 332, an antenna 334, a digital baseband chipset 336, and a man/machine interface (MMI) 338. The transceiver unit 332 includes transmitter circuitry 340 and receiver circuitry 342 for receiving and transmitting radio-frequency (RF) signals. The transceiver unit 342 couples to the antenna 334 for converting electrical current to and from electromagnetic waves. The digital baseband chipset 336 contains a digital signal processor (DSP) 344 and performs signal processing functions for audio (voice) signals and RF signals. As FIG. 19 shows, the digital baseband chipset 336 may also include an on-board microprocessor 346 that interacts with the man/machine interface (MMI) 338. The man/machine interface (MMI) 338 may comprise a display device 348, a keypad 350, and the Subscriber Identity Module 300. The on-board microprocessor 346 performs GSM protocol functions and control functions for the radio circuitry 340 and 342, for the display device 348, and for the keypad 350. The on-board microprocessor 346 may also interface with the Subscriber Identity Module 300 and with the content sharing application 22 residing in the memory module 308 of the Subscriber Identity Module 300. Those skilled in the art will appreciate that there may be many suitable architectural configurations for the elements of the mobile device 330. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TSAL, GSM CELLULAR RADIO TELEPHONY 99-130 (1997), with each incorporated herein by reference.

The content sharing application 22 may be utilized regardless of signaling standard. As those of ordinary skill in the art recognize, FIGS. 16-19 illustrate a Global System for Mobile (GSM) communications device. That is, the communications device utilizes the Global System for Mobile (GSM) communications signaling standard. Those of ordinary skill in the art, however, also recognize the content sharing application 22 is equally applicable to any mobile communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA/WCDMA signaling standard.

Figure 20:
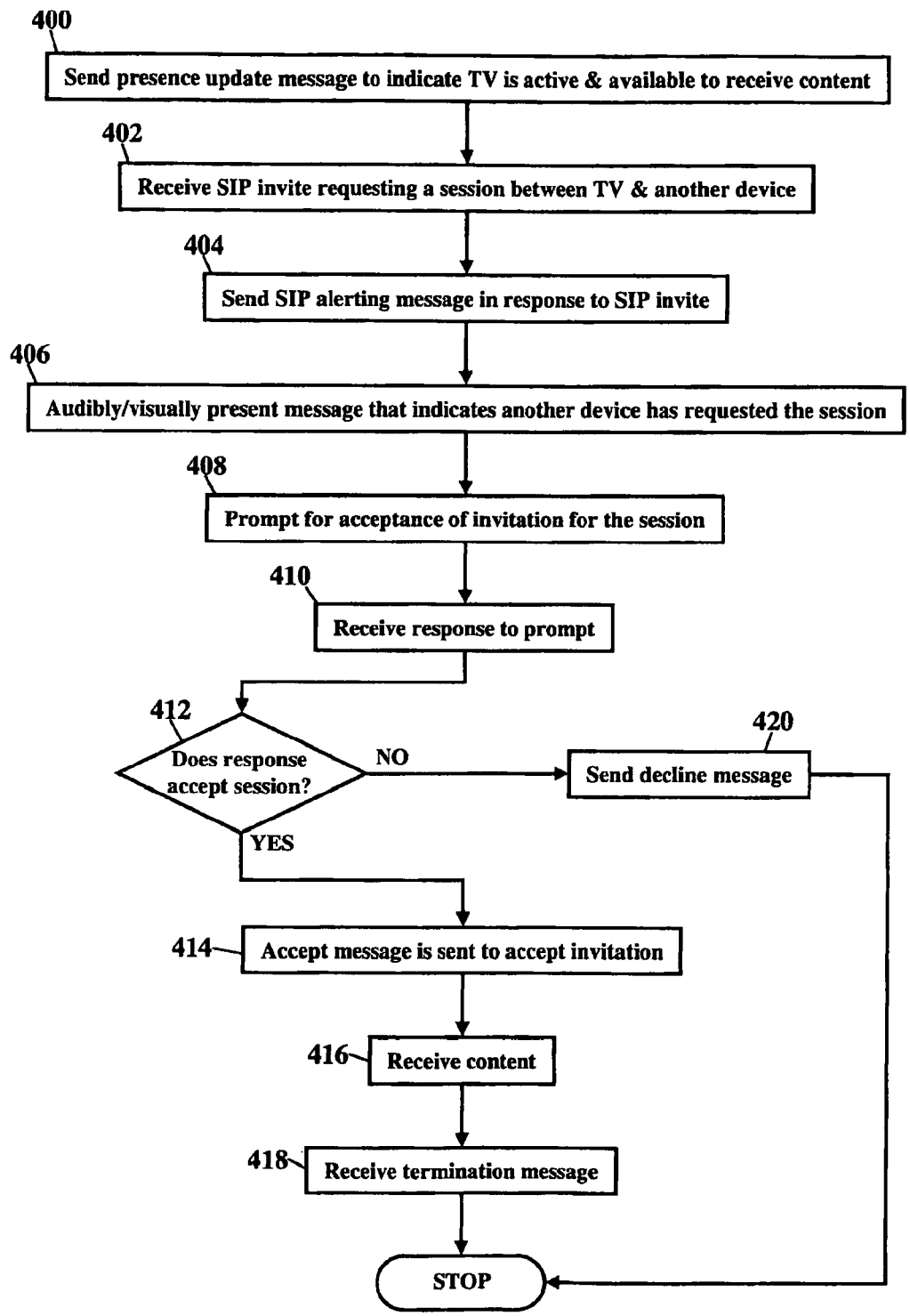
FIG. 20 is a flowchart illustrating a method of sharing content, according to an exemplary embodiment.

FIG. 20 is a flowchart illustrating a method for sharing content. A presence update message is sent to indicate a television is active and available to receive content (Block 400). A SIP invite is received (Block 402), and the SIP invite requesting a session between the media delivery device and another device. A SIP alerting message is sent in response to the SIP invite (Block 404). A message is audibly/visually presented that indicates the another device has requested the session (Block 406). A prompt is presented requesting acceptance of the invitation for the session (Block 408). A response to the prompt is received (Block 410). If the response accepts the invitation (Block 412), an accept message is sent to accept the invitation (Block 414). The content is received (Block 416). A message is received that terminates the session (Block 418). If, however, the response declines the invitation (Block 412), then a decline message is sent that declines the session invitation (Block 420).

The content sharing application (shown as reference numeral 22 in FIGS. 1-19) may be physically embodied on or in a computer-readable medium. This computer-readable medium may include CD-ROM, DVD, tape, cassette, floppy disk, memory card, and large-capacity disk (such as IOMEGA®D, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the calendaring application to be easily disseminated. A computer program product comprises the content sharing application stored on the computer-readable medium. The content sharing application comprises computer-readable instructions/code for sharing content with a media delivery device. A presence update message is sent to indicate the media delivery device is active and available to receive content. A SIP invite is received, the SIP invite requesting a session between the media delivery device and another device. An accept message is sent to accept the invitation. The content is received until a message terminates the session.

The content sharing application may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for sharing content, the method comprising:
receiving an invite from a mobile device, the invite requesting a video sharing session with a media delivery device;
when the media delivery device is powered on, receiving a presence update message of the media delivery device by a residential gateway in which the presence update message is a precursor to a registration message that indicates the media delivery device is active and ready to receive video session invites;

establishing the video sharing session with the media delivery device;

responsive to the media delivery device not being powered on, establishing the video sharing session with the residential gateway that is connected to the media delivery device in a residential network and to the mobile device through a communication network, in which the video sharing session includes streaming video to the residential gateway from the mobile device based on a confirmation message via the gateway;

wherein the residential gateway is a computing device at a residence of a user, the residential gateway being part of the residential network of the user with the media delivery device;

responsive to the media delivery device being previously engaged in another video sharing session, establishing the video sharing session with the residential gateway for streaming the video to the residential gateway, the residential gateway being connected to the communication network.

2. The method of claim 1, further comprising when the residential gateway is unavailable, causing the video sharing session to be established with a network memory location on a network server at the communication network; and wherein the network location on the network server is distinct from the residential gateway on the residential network; and wherein the communication network is distinct from the residential network.

3. The method of claim 1, further comprising providing quality of service by the residential gateway at the residential network.

4. The method claim 1, further comprising presenting a message for display on the media delivery device indicating that the mobile device has requested the video sharing session, in which the video sharing session includes live streaming video from the mobile device to the media delivery device.

5. The method claim 1, further comprising sending an accept message to accept the invite;
receiving the content; and
receiving a message that terminates the video sharing session.

6. The method of claim 1, further comprising sending a presence update message to indicate that the media delivery device is active and available to receive content.

7. The method of claim 1, wherein the invite establishes the video sharing session between the media delivery device and the mobile device.

8. An apparatus, the apparatus comprising:
a processor for a residential gateway; and
memory comprising computer-executable instructions that, when executed by the processor, cause the processor to perform operations comprising:
receiving an invite from a mobile device, the invite requesting a video sharing session with a media delivery device;
when the media delivery device is powered on, receiving a presence update message of the media delivery device by the residential gateway in which the presence update message is a precursor to a registration message that indicates the media delivery device is active and ready to receive video session invites;
establishing the video sharing session with the media delivery device;
responsive to the media delivery device not being powered on, establishing the video sharing session with the residential gateway that is connected to the media delivery device in a residential network and to the mobile delivery device through a communication network, in which the video sharing session includes streaming video to the residential gateway from the mobile device based on a confirmation message via the gateway;
wherein the residential gateway is a computing device at a residence of a user, the residential gateway being part of the residential network of the user with the media delivery device;
responsive to the media delivery device being previously engaged in another video sharing session, establishing the video sharing session with the residential gateway for streaming the video to the residential gateway, the residential gateway being connected to the communication network.

9. The apparatus of claim 8, wherein when the residential gateway is unavailable, the video sharing session is to be established with a network memory location on a network server on a communication network.

10. The apparatus of claim 8, wherein the media delivery device sends an accept message to accept the invite, receives content, and receives a message that terminates the video sharing session.

* * * * *